HOFFMAN & LIMEBECK.
Cultivator.
No. { 2,736, 33,740. }
Patented Nov. 19, 1861.
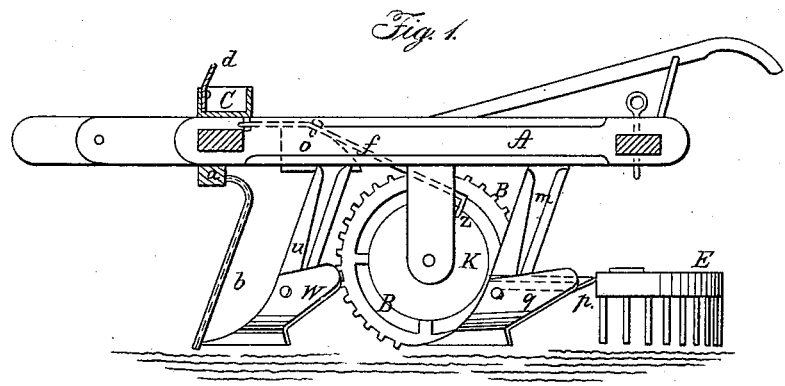
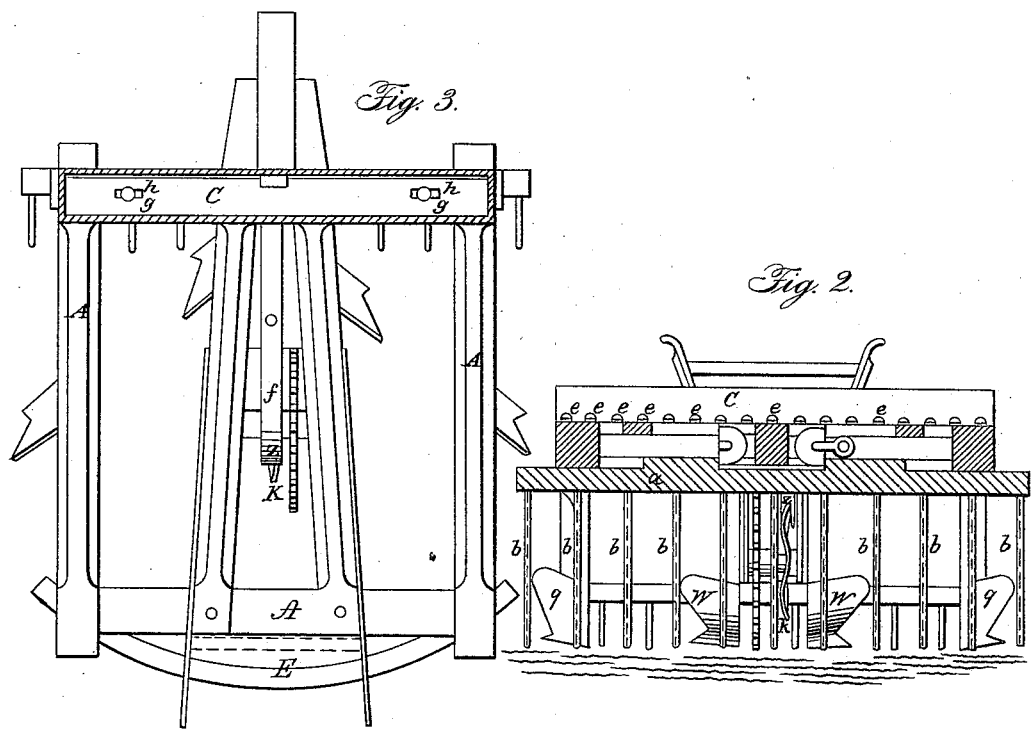
Witnesses:
Wm Hughes
Inventor:
A. Hoffman
H. W. Limebeck
J. Th. Alexander Atty

UNITED STATES PATENT OFFICE.

A. HOFFMAN AND H. W. LIMEBECK, OF HALF DAY, ILLINOIS.

IMPROVEMENT IN CULTIVATORS.

Specification forming part of Letters Patent No. 33,740, dated November 19, 1861.

*To all whom it may concern:*

Be it known that we, A. HOFFMAN and H. W. LIMEBECK, of Half Day, in the county of Lake and State of Illinois, have invented certain new and useful Improvements in Cultivators; and we do hereby declare that the following is a full, clear, and exact description of the same, reference being had to the accompanying drawings, and to the letters of reference marked thereon, in which—

Figure 1 is a side elevation; Fig. 2, a cross-vertical section, and Fig. 3 a plan view.

The nature of our invention consists in the combination and arrangement of certain devices, the peculiarities of which will be hereinafter fully set forth.

To enable others skilled in the art to make and use our invention, we will now describe its construction and operation.

A represents the frame, more fully shown in Fig. 3.

$b\ b\ b$ are a series of teeth secured to cross-piece $a$.

C represents a seed-box, which should be provided with the apertures $e\ e\ e$.

$d$ is a slide for the purpose of suspending the operation of the seeding apparatus when desirable.

$g\ g$ represent a couple of slots in the bottom of the seed-box, through which pass the headed bolts or pins $h\ h$. Thus the box C will oscillate when operated upon in a manner hereinafter explained.

B represents a driving-wheel, and $k$ a cam-wheel, both arranged upon the same shaft.

$f$ is a bent lever attached to the seed-box C, and working on a pivot at $o$. The lower and rear end of this lever is bent down at a right angle and slotted at Z, so as to form a fork for the cam-wheel $k$ to work in, as is shown in red lines, Fig. 1. $o$ is the fulcrum of lever $f$. Thus it will be observed that as the cam-wheel revolves the lever will impart an oscillating motion to the seed-box.

E represents a curved harrow or rake, which is attached to the beams $m\ m$ by means of the connecting-pieces $p\ p$. Said pieces are loosely bolted to the beams in order to allow of the harrow E being taken up or suspended at any time.

$q\ q$ represent two plows attached to beams $m\ m$. $w\ w$ are also two plows secured to beams $u\ u$. It must be particularly observed that these plows should turn to the right and left, according to the sides upon which they are placed. Thus upon the right side they must turn to the right, &c.

The operation of our machine is as follows: Should it be desirable to sow small grain, the slide $d$ is elevated and the machine is put in motion. The cam-wheel, revolving, immediately acts upon the lever, as already described, and a zigzag or oscillating motion is imparted to the seed-box, which, being agitated, causes the grain to be distributed equally over the surface of the ground.

The operation of the seeding apparatus may at any time be suspended by simply closing the apertures by means of the slide.

Having thus fully described our invention, what we claim, and desire to secure by Letters Patent, is—

The seed-box C, cam-wheel $k$, lever $f$, harrow E, teeth $b\ b\ b$, and plows $q\ q$ and $w\ w$, when all are constructed and arranged substantially in the manner and for the purpose set forth.

In testimony that we claim the foregoing, we hereunto set our hands in the presence of the following witnesses.

AUGUSTUS HOFFMAN. [L. S.]
H. W. LIMEBECK. [L. S.]

Witnesses:
JOHN LOCKHEAD,
L. H. BRACE.